Aug. 10, 1926.
G. F. GUNDLACH
1,595,836
GUARD FOR MEAT CHOPPERS
Filed Nov. 4, 1925
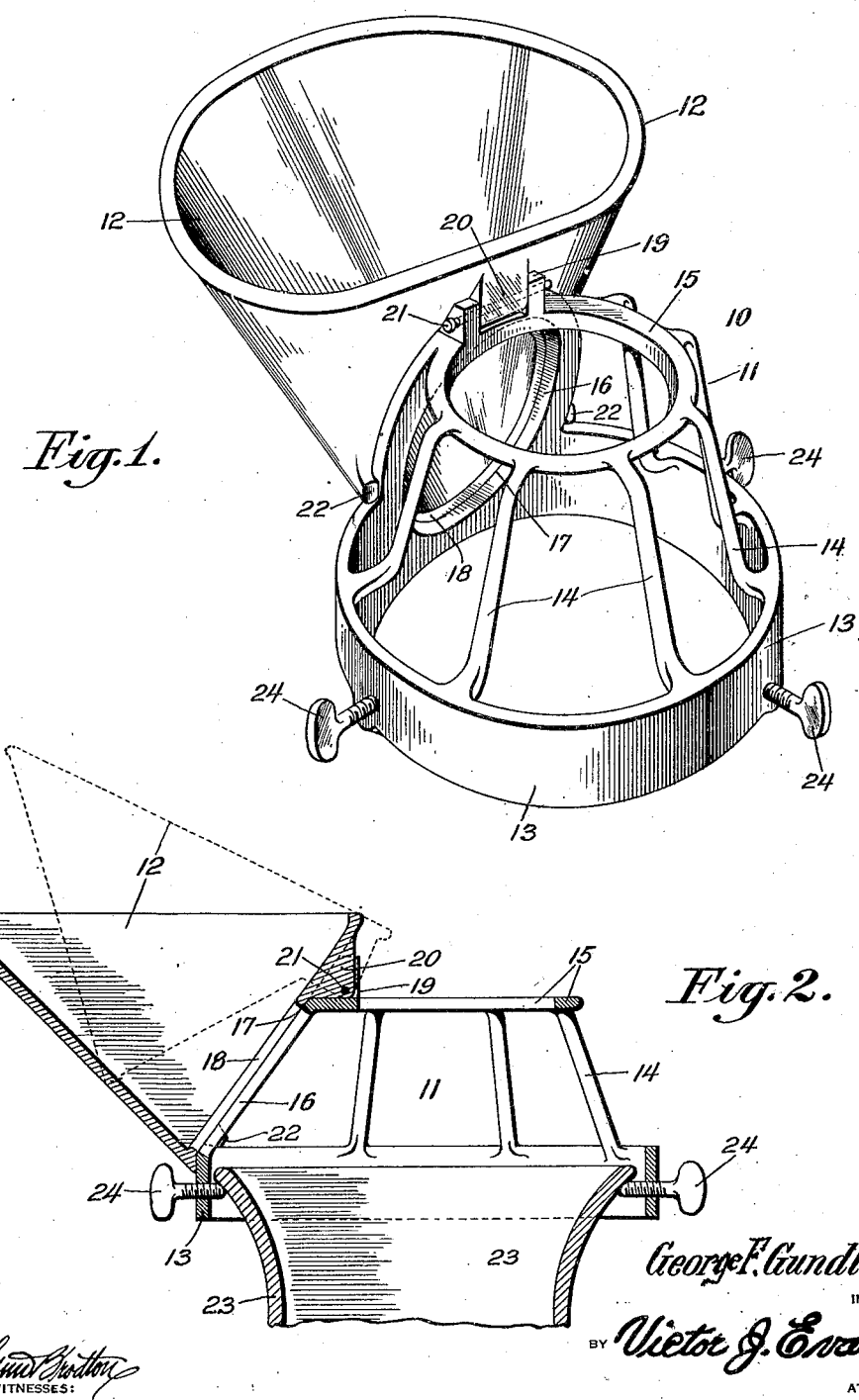

Patented Aug. 10, 1926.

1,595,836

UNITED STATES PATENT OFFICE.

GEORGE F. GUNDLACH, OF BRONX, NEW YORK.

GUARD FOR MEAT CHOPPERS.

Application filed November 4, 1925. Serial No. 66,807.

This invention relates to guards for meat choppers and is an improvement over my invention shown and described in my pending application Sr. No. 40008, filed June 27th, 1925.

The primary object of the invention resides in a guard so constructed as to be readily attached to the hopper of a meat grinding or chopping machine so as to permit meat to be fed into the hopper and at the same time accommodating the tamper or other implement used for forcing the meat into contact with the knives of the machine.

Another object of the invention is the provision of an attachment for the hopper of a meat grinder which includes a guard for protecting the hands of an operator from contact with the knives of the grinder, and on which guard a hopper is mounted for receiving the meat in a manner as not to interfere with the tamping of the meat in the hopper of a grinder while the same is being fed through the hopper on the guard.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my improved guard for meat grinders.

Figure 2 is a vertical sectional view therethrough showing the same in position on the hopper of a meat grinding machine.

Referring more particularly to the drawing, the reference numeral 10 designates my improved meat grinder attachment in its entirety and which includes a guard 11 and a hopper 12.

The guard 11 is constructed from metal and is preferably cast in a single piece to provide an annular ring or base 13, from which rises radially arranged spaced legs 14 which connect with a relatively smaller ring 15 arranged axially with respect to the ring 13. The guard is provided with an opening 16, the outer walls adjacent which serve as an inclined seat 17 for co-action by the inclined face of the hopper 12. The side of the hopper is provided with an outlet opening 18 which is relatively smaller than the mouth of the hopper, and which opening 18 registers with the opening 16 in the guard when the hopper is seated.

The top ring 15 is provided with spaced ears 19, between which an ear 20 formed on the hopper is received. A pivot pin 21 passes through the aligned ears and serves to swingingly support the hopper 12 upon the guard 11. To prevent lateral movement of the hopper when seated, I provide lugs 22 on the hopper for engagement with certain of the legs 14.

In Figure 2 of the drawing, I have shown my invention as applied to the hopper 23 of a meat grinding machine and the same is detachably held thereon by suitable set screws 24 carried by the base or ring 13 which are screwed tight against the sides of the hopper 23.

From the foregoing description, it will be seen that the meat to be chopped is inserted through the hopper 12 and into the hopper 23 of the grinder through the opening 16. The tamper or other implement employed for forcing the meat into the grinder is passed through the opening or ring 15 in the top of the guard and may be reciprocated during the insertion of the meat without interference with the passage of the meat from one hopper to the other. This eliminates the necessity of lifting the tamper free of the hopper of the grinder as the meat is fed thereto and prevents injury to the hand of an operator.

For cleaning purposes, the hopper may be swung about its pivot pin 21 or the pin may be withdrawn for removing the hopper from the guard should the occasion necessitate. When not in use, the hopper 12 may be swung over the guard 11 so as to take-up a minimum amount of space.

What is claimed as new is:—

1. An attachment for meat grinding machines comprising a guard having an opening therein, and a hopper having an outlet opening in registration with said first mentioned opening.

2. An attachment for meat grinding machines comprising a guard having an opening therein, and a hopper swingingly mounted on said guard and having an outlet opening in registration with said first mentioned opening.

3. An attachment for meat grinding machines comprising a guard, attaching means therefor, a seat provided on said guard, and a hopper supported by said guard and resting on said seat, said hopper and guard having communication with each other.

4. An attachment for meat grinding machines comprising a guard, attaching means therefor, an inclined seat provided on said guard, and a hopper removably supported by said guard and resting on said seat, said hopper and guard having communication with each other.

5. In combination with the hopper of a meat grinding machine, a guard therefor, attaching means for securing said guard to said hopper, and a hopper mounted on said guard and communicating with said first hopper.

6. In combination with a guard for meat grinding machines having an opening therein, and a hopper having an outlet opening in registration with the said first opening.

7. In combination with a guard for meat grinding machines having an opening therein for the insertion of a tamper, and a hopper mounted on said guard and having communication with the interior of said guard whereby meat may be inserted through said hopper to said guard and simultaneously tamped with the tamper.

In testimony whereof I have affixed my signature.

GEORGE F. GUNDLACH.